United States Patent [19]

Delgrange et al.

[11] Patent Number: 5,028,291

[45] Date of Patent: Jul. 2, 1991

[54] METHOD FOR MOLDING AND MARKING THE SURFACE OF ARTICLES

[75] Inventors: Jacques Delgrange, Lys Lez Lannoy; Pierre Lelievre, Hem, both of France

[73] Assignees: Societe Nouvelle des ets Ryo Catteau S.A.; Societe Hutchinson S.A., both of Paris, France

[21] Appl. No.: 306,466

[22] Filed: Feb. 6, 1989

[30] Foreign Application Priority Data

Feb. 8, 1988 [FR] France ............................... 88 01769

[51] Int. Cl.⁵ .............................................. B29C 47/00
[52] U.S. Cl. .................................... 156/245; 156/246; 264/162; 264/245; 264/255; 264/275; 264/278; 264/279
[58] Field of Search ................ 264/162, 245, 255, 275, 264/278, 279; 156/245, 246

[56] References Cited

U.S. PATENT DOCUMENTS

| | | | |
|---|---|---|---|
| 4,213,926 | 7/1980 | Toyoda et al. | 264/245 |
| 4,500,218 | 2/1985 | Nishikawa | 264/245 |
| 4,657,419 | 4/1987 | Takakuwa | 264/245 |

FOREIGN PATENT DOCUMENTS 575198  4/1958  Italy ...................................... 264/245

*Primary Examiner*—Peter Chin
*Attorney, Agent, or Firm*—Kerkam, Stowell, Kondracki & Clarke

[57] ABSTRACT

The invention relates to a method of marking the surface of articles, more particularly but not exclusively with a view to obtaining distinctive signs on non-plane surfaces such as the surface of balls. It is characterized in that the material (8) comprising the sign (2) is molded on a temporary support (11) that is independent of the article, and benchmark means (12) are molded on that same support; in the mold for the article, which is made in at least two portions (14, 15), the temporary support is inserted, which with the aid of the benchmark means (12) is positioned with respect to one (15) of the portions (14, 15) of the mold; from the inside portion (15) of the mold (13), the material which will make the article is injected into the mold, and with the aid of the pressure of this material, the temporary support is locally deformed and presses its outside face (19) against the impression (17) of the portion of the mold that will form the marked surface of the article that carries the sign; the temporary support is removed, and the surface thus exposed is finish-ground. The invention is applicable to the gambling equipment industry.

7 Claims, 2 Drawing Sheets

METHOD FOR MOLDING AND MARKING THE SURFACE OF ARTICLES

The invention relates to a method of marking the surface of articles, more particularly but not exclusively with a view to obtaining distinctive signs of non-plane surfaces, such as the surface of balls.

The invention also relates to means for performing the method, and to the articles so marked, such as gambling balls and/or balls drawn in a lottery.

BACKGROUND OF THE INVENTION

A lottery drawing or the like is generally done by first extracting at least one ball from a batch of balls mixed in the same receptacle, each having a value different from that of the other balls, and second receiving each extracted ball on a track or in at least one conduit; the ball comes to a stop at the end of the track or conduit, or against the last previous ball received.

To enable the operator and spectators to read the results of the drawing easily, each ball is generally marked several times by a sign corresponding to the value represented, such as a number. These signs are distributed about the ball in such a manner that regardless of the position in which the ball comes to a stop, a directly readable sign is always available facing the operator.

Considering the sums of money generally involved, the balls must be perfectly balanced, must adhere to very close tolerances in weight, and must be marked in a very legible manner. During the drawing, the balls are tumbled before being drawn, for example by rotating the receptacle containing them. This subjects the balls and their markings to wear by abrasion as they roll on one another and on the inside wall of the receptacle.

At present, the balls are made from spheres on the surface of which the distinctive signs, in particular numbers, are marked superficially by means of stencils. Given the spherical form of the surface on which the sign is placed and given that a plurality of distinctive signs must be marked on the surface of the same ball, and that for esthetics reasons it is also necessary for the distinctive signs to be regularly distributed about the ball, the difficulties presented by this operation of marking of the balls will readily be appreciated.

To facilitate the operation of marking and permit mass production of the basic ball, a method is known (French Patent 2.577.429), according to which a core with a spherical envelope is made that regardless of the sign to be placed on it has identical sites at the locations of the marking signs. A pellet is placed in each of these sites, with the pellet having a shape complementary to that of the site and having been superficially marked beforehand with the proper sign. This method makes it possible to make the marking before the pellet is put in place and hence while the pellet is still flat, which is clearly simpler than marking directly on the curved surface of the ball. However, the fact remains that this marking, like the one on the ball itself, remains superficial and is not resistant to the aforementioned abrasion over the long term.

Another method is also known (French Patents 2.577.429 and 2.141.231), in which the pellets are made of transparent material. The sign is placed on the back of the pellet or at the bottom of the site or on an intermediate plate. Though the sign is well protected against abrasion, the outer surface of the pellet is still subject to abrasion and will rapidly become opaque, in which case the sign becomes illegible. Moreover, the differences in material between the pellets and the core make for irregular rolling and rebounding as well as irregular wear of the balls.

For the mark to remain visible for a long time, methods for deep marking, instead of the above superficial marking, are also known. In one such method (U.S. Pat. No. 3,364,607), the ball is made in three principal parts, a spherical core and two hemispherical half shells enveloping the core. For the marking per se, an insert is molded separately, which includes a concave base that has the sign to be placed, right side out, located in relief on its upper face. This insert is then fastened tightly between the envelope and the core, before the sign, in relief, is engraved by force in the envelope, which is done by pressing the envelope against the core. Finally, the top of the reliefs of the sign are exposed by finish-grinding of the outer surface of the ball, and the sign remains substantially legible until the entire envelope has worn away.

Although this method gives good results in terms of resistance to abrasion, it is difficult to use when using a sign made of the same material as the envelope, which would make its engagement in the envelope uncertain. Moreover, even if the sign is engraved from the inside face of the envelope, it deforms, which makes it less legible and creates irregularities in density that are incompatible with the regularity of rolling and rebounding that gambling balls must exhibit. Further, the two half-shells create an additional irregularity at their junction.

In another method for deep marking (French Patent 2.050.827), when the ball is molded, voids representing the signs are left in the wall. In the course of a second injection operation, these voids are filled with a certain quantity of synthetic material of a color different from that of which the ball is made, to make the sign show up. Although this method gives good results in terms of resistance to abrasion, to be performed it requires as many ball molds as there are separate signs to be applied, and moreover, for injecting the signs on top of the balls, precise positioning of the ball is difficult to obtain.

OBJECT AND SUMMARY OF THE INVENTION

One object the invention seeks to attain is a method of marking of the above type, which is deep, and hence durable, and can also be used simply and under profitable conditions, and which when applied to balls facilitates the positioning of the signs and produces balls that exhibit excellent regularity in density and hardness and are well balanced.

To this end, the invention relates to a method of the above type, characterized in particular in that:

the material comprising the sign seen inside out is molded on a face called the inside face of a temporary support which is independent of the article that will carry the sign. Reference marking means are molded on the same support with respect to the sign. The reference portion closest to this sign is positioned at a distance greater than that which will remain in the same direction between the sign and the contour of the object that will carry the sign.

On the mold of the article, which is made in at least two parts, and with which the joining plane is located in such a manner that it passes along the periphery of the surface to be marked by the sign, such that one of said portions of the mold carries only the impression of the marked portion of the article, while the other portion of the mold, known as the inside portion, carries the impression of the remainder of the article, the temporary support is inserted between these two mold portions, which temporary support, with the aid of the reference means, is positioned with respect to one of the mold portions, against which the temporary support is applied.

From the inside portion of the mold, the material that will make the article is injected into the mold, and with the aid of the pressure of this material, the temporary support is locally deformed and its outside face is pressed against the impression of the portion of the material that will form the marked surface of the article that will carry the sign.

The temporary support is removed, and the thus-exposed surface is finish-ground.

The invention also relates to the means for performing this method and to the articles thus obtained.

The invention will be better understood from the ensuing detailed description of an exemplary embodiment, which is understood not to be limiting, taken in conjunction with the accompanying drawings.

DESCRIPTION OF THE PREFERRED EMBODIMENTS

Figure 1:
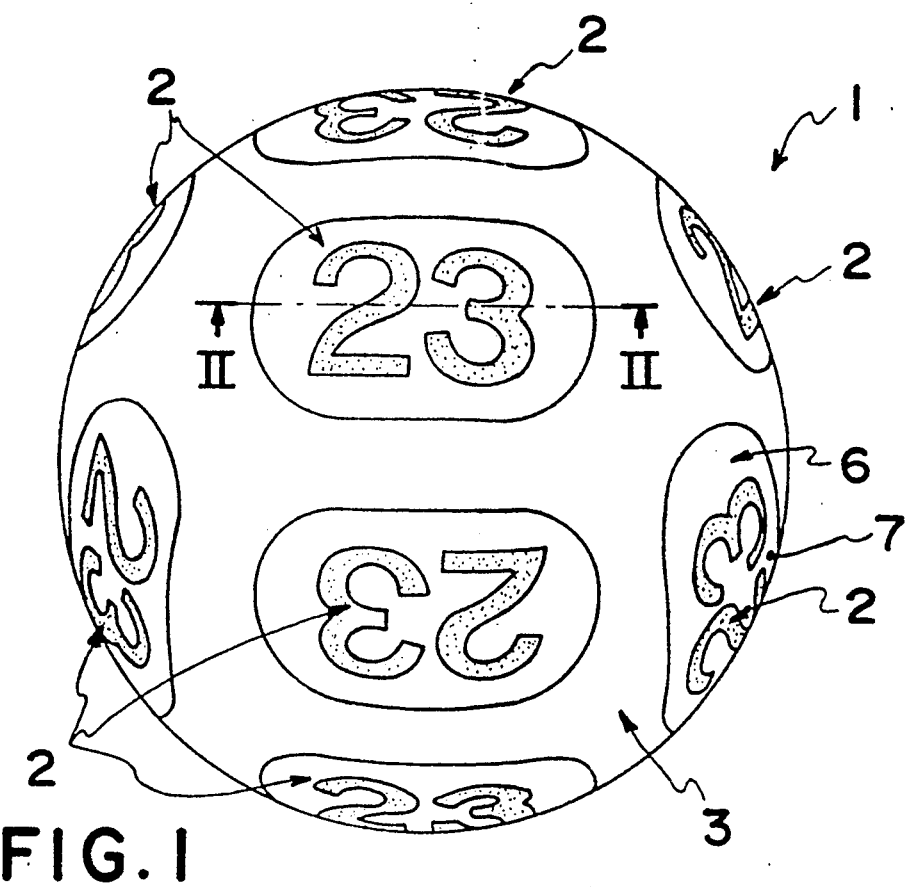
FIG. 1 shows a ball obtained by the method of the invention.
Figure 2:
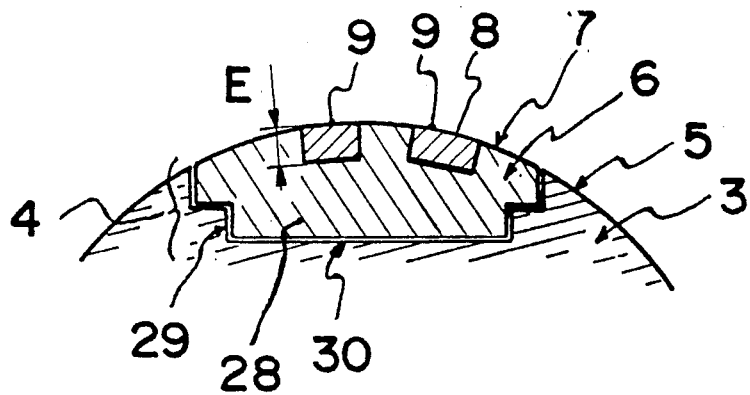
FIG. 2 is a section taken along the line II—II of FIG. 1.
Figure 3:
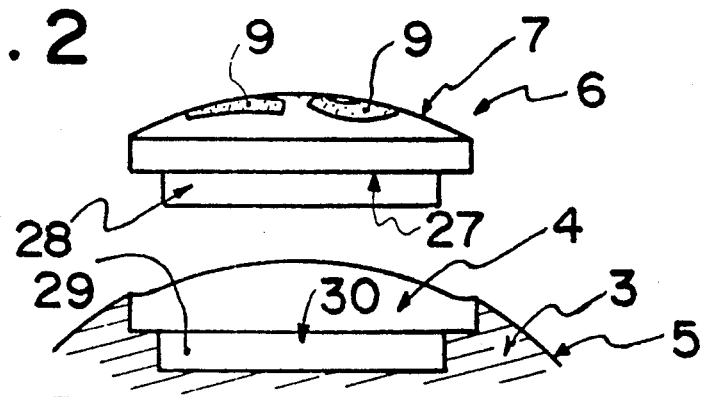
FIG. 3 is an exploded view of the elements shown in FIG. 2.
Figure 4:
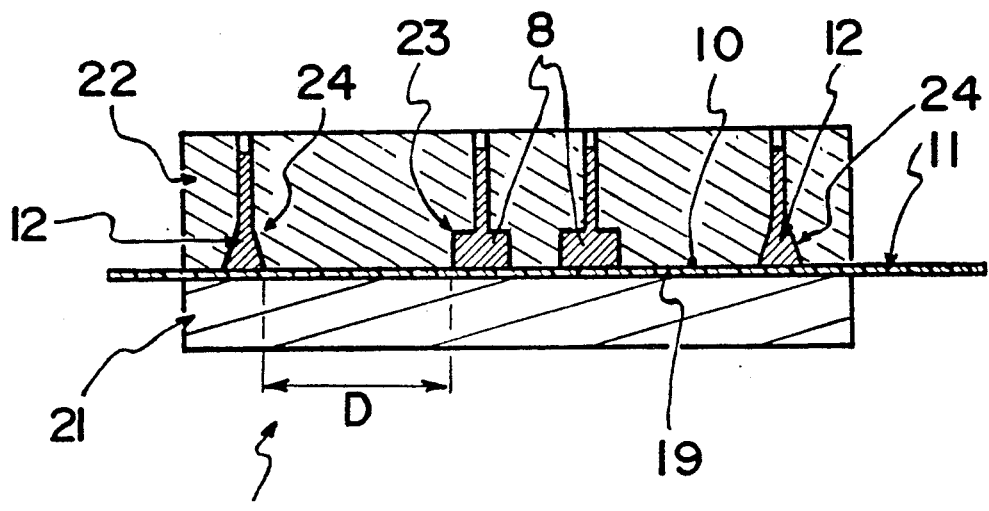
FIG. 4 shows one of the means for embodying the invention.
Figure 5:
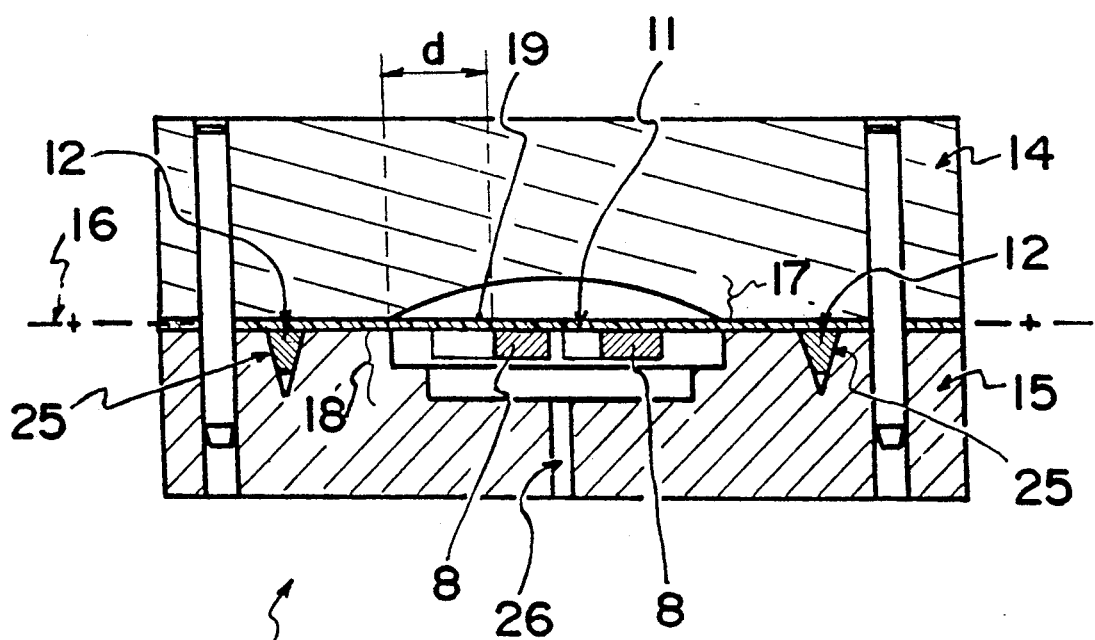
FIG. 5 shows another means for embodying the invention.

FIG. 1 shows a ball 1 that carries a plurality of distinctive, identical signs 2 on its surface, which make it possible to identify the ball and in the present case comprise at least one number, for example.

Naturally, the ball shown in the drawings is merely an illustration of the invention and does not limit its scope in any way, either in terms of the distinctive signs used or their arrangement.

The ball 1 has at least one distinctive sign making it possible to identify it, but preferably it has a plurality of distinctive, generally similar signs, which are distributed with precision over the entire outside surface in such a way as to make one of the distinctive signs legible, and hence permit identification of the ball, regardless of the position in which the ball comes to a stop.

Various positions of the distinctive signs are accordingly possible, such as that shown in FIG. 1, which shows a succession of signs alternatingly right side up and upside down along a circle of large diameter on the ball, and in a triangle on either side of the signs. In this case, the ball 1 has twelve distinctive signs 2 distributed over its outside surface. It should be recognized, however, that this feature does not limit the scope of the invention. By way of example, the number 23 has been reproduced as a distinctive sign.

Other arrangements are also possible, in particular a circle, with a square, a cross, or stars, and crosses, and so forth, on either side of the circle.

According to the invention, the ball 1 includes a core 3 having a substantially spherical envelope. The core may be solid or hollow on the inside. It is made of any suitable synthetic or natural material, in particular of elastomer or plastomer, and is preferably made by molding.

The ball 1 includes the following:

a core 3 with a site 4 hollowed out from the enveloping surface 5 of the core 3, located at the location for each distinctive sign 2, and for each site 4, a pellet 6 carrying the distinctive sign and including an inside portion which has a shape substantially corresponding to the shape of the site 4, at least partially filling the depth of the hollow of the site 4, and an outer portion principally including the outer surface 7 of the pellet 6, which is contoured in such a manner as to have the same curvature as the outer surface 5 of the core 3, and such that its surface is substantially in continuity with this outer surface 5 of the core. Thus, when the pellets 6 are mounted inside their respective site 4, the outer surfaces 5 of the core and the outer surfaces 7 of the pellets 6 globally comprise a sphere.

On the inside, the sites 4 all have an appropriate shape, for instance that shown in the drawings; in cross section, along a plane perpendicular to the radius of the sphere, they have a substantially oval shape, and preferably, at least locally, have any shape determining the orientation of the pellet, for instance a rectangular or elliptical shape. The pellets 6, in cross section along the same plane, have a shape complementary to the shape of the sites 4, and in particular the substantially oval shape shown in the drawings.

For the marking of the pellet 6, a material 8 of a color contrasting with the color of the material comprising the pellet, and the outer surface 9 of which follows the contours of the sign 2, is embedded in the material comprising the pellet. The material penetrates into the pellet over a major thickness "E", so that the marking will be sufficiently deep to be durably resistant to the abrasion that it will undergo jointly with the outer surface 7 of the pellet 6.

Instead of preserving voids in the pellet or ball into which the marking material 8 is additionally injected, an essential feature of the invention provides that in order for each sign to be placed on an article such as a pellet, the material 8 comprising the sign 2 seen inside out is molded on one face 10, known as an inside face, of a temporary support 11 that is independent of the article 6, and on that same support, reference means 12, preferably of the same material, are molded, of which means, with respect to the sign, the portion closest to the sign is positioned at a distance "D" greater than the distance "d" which will remain in the same direct on between the sign 2 and the contour of the article that will carry the sign;

in the mold for the article, which is made in at least two parts 14, 15, of which the joining plane 16 is located in such a manner that it passes along the periphery of the surface 7 that will be marked with the sign, such that one portion 14 of the mold will carry only the impression 17 of the marked portion of the article, while the other portion 15 of the mold, known as the inside portion, carries the impression 18 of the remainder of the object, the temporary support is inserted between these two portions of the mold, which temporary support, with the aid of the benchmark means 12, is positioned with respect to one 15 of the portions 14, 15 of the mold, against which portion 15 of the mold the temporary support 11 is applied;

from the portion 15 known as the inside portion of the mold 13, the material which will make the article is injected into the mold, and with the aid of the pressure of this material, the temporary support is locally deformed and presses its outside face 19 against the impression 17 of the portion of the mold that will form the marked surface 7 of the article 6 that carries the sign;

the temporary support is removed, and the surface 7 thus exposed is finish-ground.

The references may naturally be molded on the support 11 in a separate phase of the molding of the sign, but preferably, to avoid having to perform an intermediate positioning, it is done at the same time. Similarly, they may be molded on the opposite side from this inside face 10 carrying the sign, but preferably they are molded on the same face 10, and in that case, the support is positioned with respect to the inside portion 15 of the mold on which this support presses its face called the inside face.

Advantageously, in the case where the marked object is the pellet of the ball mentioned above, rather than the entire ball, the core 3, pellet 6 and sign 2 are made of the same material, such as a plastomer or an elastomer, and preferably natural rubber.

The sign is then prevulcanized prior to its insertion into the mold of the pellet, and then the sign is at least partially vulcanized in the mass of the pellet, before the pellet is seated in its site and fixed by vulcanization or gluing, for example with cyanoacrylic glue.

The entire assembly is then finish-ground, for example by sanding.

Advantageously, the temporary support is selected to be sufficiently porous to assure retention of the material making the signs, at least until the pouring of the pellet, but sufficiently anti-adhesive that it can later be removed. Good results are for example obtained with a rayon fabric thirty-five hundredths of a millimeter in thickness (0.35 mm) and 210 g/m$^2$ in weight, with a rayon thread warp of 440 dtex, because it has 140 threads per 5 cm, and a rayon thread weft of 440 dtex because it has 85 threads per 5 cm, these threads having a breaking strength per 5 cm of 80 daN and 60 daN, respectively, and respective elongations of 26% and 20%.

The means for performing this method include:

a first mold 20 made in at least two portions 21, 22, one of which is preferably plane and serves to support the temporary support face 11 and the other of which carries the impression 23 of the sign to be attached, for each article to be made, said mold further including impressions 24 for the reference or benchmark means 12, the temporary support 11, which upon leaving the first mold is provided with both the sign 2 and the reference or benchmark means 12, a second mold 13, also made in at least two portions 14, 15, the joining plane 16 of which passes along the periphery of the surface 7 that will be marked with the sign, such that for each article, one portion 14 of the mold carries only the impression 17 of the marked portion of the article, while the other portion 15 of the mold, known as the inside portion, carries the impression 18 of the remainder of the article, but also the arrival tube 26 of the material under pressure, said mold further including impressions 25 for the site of the benchmark means 12 of the temporary support.

The balls thus obtained have the advantage of having the same hardness and the same rebounding characteristics throughout.

Preferably, to further improve the anchoring of the pellet in its site and to move the gluing plane farther away from the rolling surface to prevent its breaking, the lower face 27 of the pellet has a central head 28 that engages an orifice 29 provided for this purpose in the bottom 30 of the site 4.

The advantage of the method is clearly to enable the making of the sign in flat form, and then to shape it and position it with high precision, but simply, in the mold for the pellet.

What is claimed is:

1. A method of molding and marking at least one distinctive symbol (2) of the contoured surface portion (7) of an article (6), the method comprising:

molding a material comprising said symbol (2) on an inside face of a temporary support (11) which is independent of said article, said molded symbol being seen as being inside out on said inside face of said temporary support, molding benchmark means onto said temporary support for positioning said temporary support in an article molding means, wherein a portion of said benchmark means closest to said symbol is positioned to be at a first distance (D) greater than a second distance (d) measured from said portion of said symbol to a peripheral edge of the contoured surface of said article (6) which is subsequently molded to carry said symbol, inserting said temporary support in between two portions of said article molding means, said article molding means having a joining plane (16) between said two portions located such that said joining plane extends along a periphery of said contoured surface (7) to be molded and marked with said symbol, a first portion of said article molding means having an impression of only a finished contour of said marked surface of said article 96), a second, inside portion of the article molding means having an impression of a remainder of the article (6), said temporary support being positioned with said benchmark means, with respect to said second, inside portion of said article molding means;

injecting into said article molding means a material for forming said article, said material being injected into said second, inside portion of said article molding means;

locally deforming, with the air of pressure from said injected material, said temporary support and pressing an outside face (19) of said temporary support against said impression in said first portion of said article molding means;

removing said article, symbol, and temporary support from said article molding means;

removing said temporary support from said article and said symbol to expose said marked surface of said article; and finish grinding said exposed surface.

2. A method as defined by claim 1, characterized in that the benchmark means (12) are molded on the support (11) at the same time as the symbols.

3. A method as defined by claim 2, characterized in that the benchmark means (12) are molded on the same face (10) of the temporary support as the symbol.

4. The method of claim 1, wherein said temporary support is sufficiently porous to assure the retention of the material embodying the symbols at least until said material to be formed into said article is injected into said mold assembly, but sufficiently anti-adhesive to permit its later removal.

5. The method of claim 4, wherein said temporary support is a rayon fabric of thirty-five hundredths of a millimeter in thickness and having a weight of 210 grams per square meter, with a rayon thread warp of 440 dtex at the rate of 140 yarns per 5 cm, and a rayon thread weft of 440 dtex at a rate of 85 yarns per 5 cm, said threads having a tear strength per 5 cm of 80 daN and 60 daN, respectively, an elongation of 26% and 20%, respectively.

6. The method of claim 1, further comprising:
inserting and securing said article (6) carrying said symbol in an associated receptacle (4) in a core (3) of a ball, said receptacle being hollowed out from an envelope surface of said core at a location of said symbol, and wherein said core, said article, and said symbol are made of the same material.

7. A method as defined in claim 6, wherein the material of the symbol is a natural rubber, and that the symbol is then prevulcanized prior to insertion into the mold for the article, then the symbol is at least partially vulcanized during the molding of the article, before the article is seated in its site and fixed by vulcanization or by gluing into the core of the ball, and finish grinding the ball, article, and symbol.

* * * * *

UNITED STATES PATENT AND TRADEMARK OFFICE
CERTIFICATE OF CORRECTION

PATENT NO. : 5,028,291

DATED : July 2, 1991

INVENTOR(S) : Jacques Delgrange, et al

It is certified that error appears in the above-identified patent and that said Letters Patent is hereby corrected as shown below:

Claim 1, Column 6, line 40  "96)" should be -- (6) --.

Signed and Sealed this

Sixteenth Day of March, 1993

Attest:

STEPHEN G. KUNIN

Attesting Officer

Acting Commissioner of Patents and Trademarks